Patented May 5, 1925.

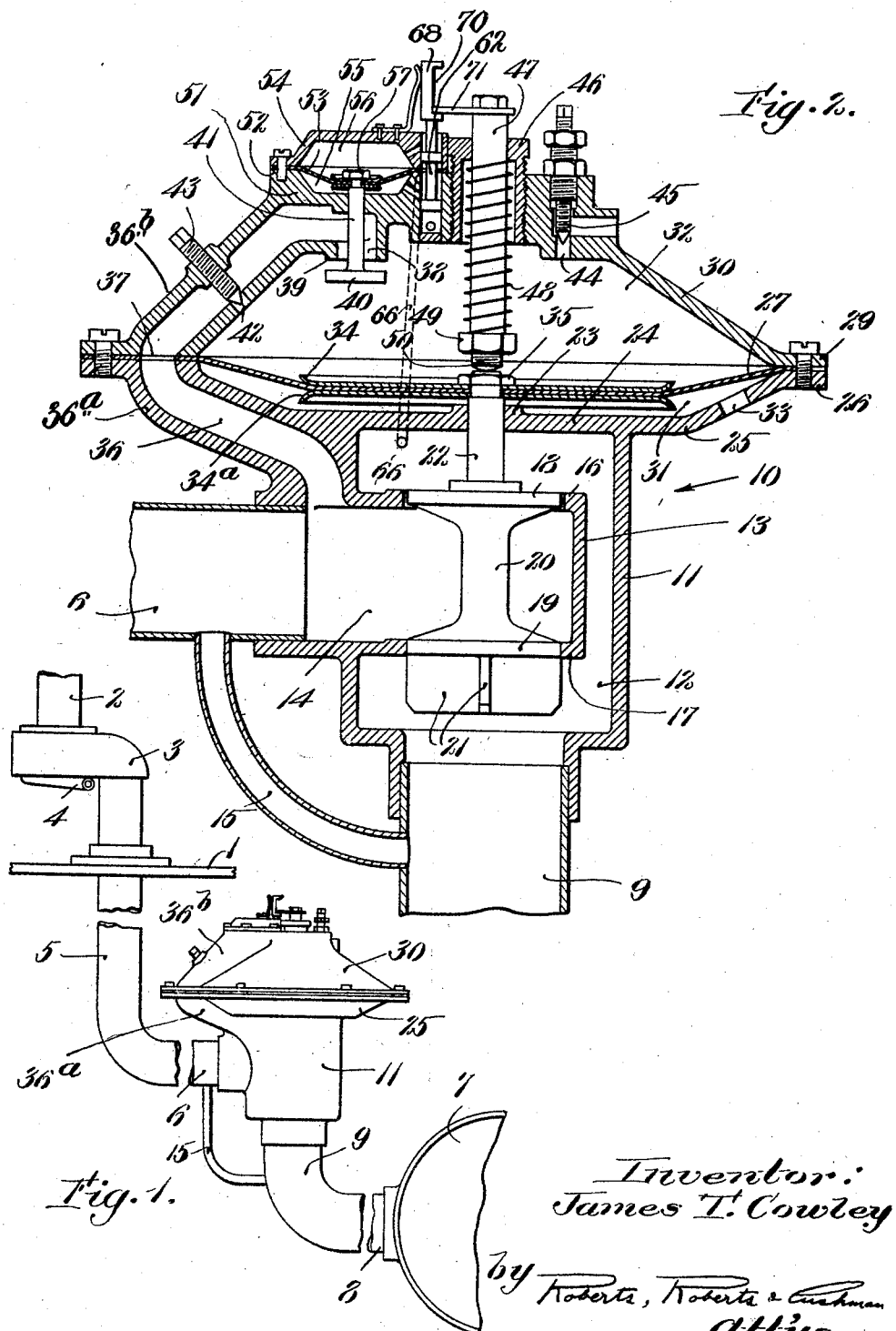

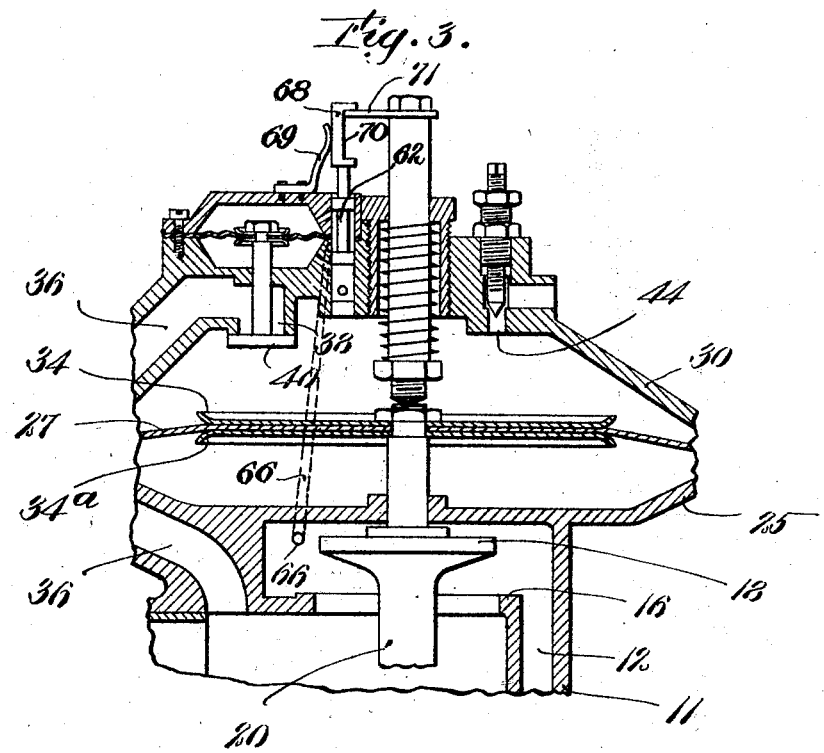
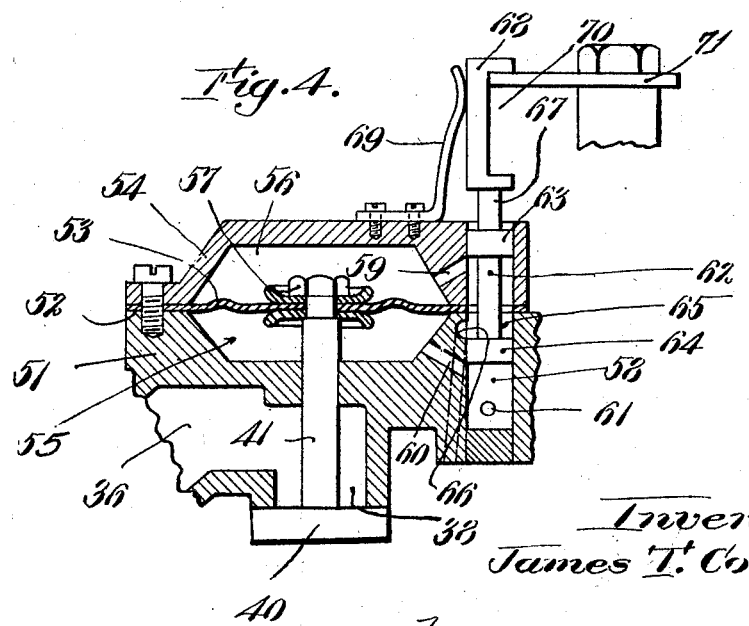

1,536,424

UNITED STATES PATENT OFFICE.

JAMES T. COWLEY, OF SYRACUSE, NEW YORK, ASSIGNOR TO THE LAMSON COMPANY, OF SYRACUSE, NEW YORK, A CORPORATION OF MASSACHUSETTS.

POWER CONTROLLER FOR CARRIER-DISPATCH SYSTEMS.

Application filed June 5, 1923. Serial No. 643,570.

*To all whom it may concern:*

Be it known that I, JAMES T. COWLEY, a citizen of the United States of America, and resident of Syracuse, in the county of Onondaga and State of New York, have invented new and useful Improvements in Power Controllers for Carrier-Dispatch Systems, of which the following is a specification.

This invention relates to automatic power controllers for pneumatic conveyor systems, and more particularly to controllers of the general type disclosed in the patent to Libbey, 968,576, August 30, 1910.

In my co-pending application, Serial No. 598,877, filed November 2, 1922, I have disclosed a power controller of the general type referred to in which the main valve is of balanced type and under control of a diaphragm which is normally exposed to the pressure in the transmission line, and which is sensitively responsive to decrease in pressure in said line, so that upon introduction of a carrier into the transmission line the diaphragm immediately responds and opens the main valve. The opening of the main valve then operates directly to close the controlling valve by which communication between the diaphragm chamber and the transmission line is cut off, thus permitting the diaphragm and main valve slowly to return to normal position.

Principal objects of the present invention are to provide an improved power controller of the type disclosed in my aforesaid application, and specifically to provide a power controller possessing greater latitude in the relative timing of the main and controlling valves, as well as to make the diaphragm and main valve somewhat more responsive to very slight variations in pressure in the transmission line.

To this end, the invention consists in general in relieving the main valve diaphragm of the actual work of closing and opening the controlling valve, employing independent motor means for this purpose. The operation of such auxiliary motor means, which may be of any desired type, preferably pneumatic, is determined by the movements of the main valve diaphragm. For best results some lost motion is provided for between the main valve and the controlling devices for the auxiliary motor in order to permit proper timing of the various parts.

In the accompanying drawings, one preferred embodiment of the invention is illustrated by way of example, and in such drawings:—

Fig. 1 is a fragmentary elevation, partly in section and partly broken away, illustrating the application of the new controlling apparatus to a pneumatic dispatch system of usual type.

Fig. 2 is a vertical diametral section to large scale through the controlling apparatus proper, showing the parts in the position which they occupy in the absence of a carrier in the transmission line.

Fig. 3 is a fragmentary view on the same scale as Fig. 2 and showing certain of the parts illustrated therein occupying the position which they assume upon the introduction of a carrier into the transmission line; and Fig. 4 is a fragmentary cross section illustrating certain of the parts shown in Fig. 2, to larger scale but occupying a different position.

Referring to the drawings, and particularly to Fig. 1, the numeral 1 indicates a portion of the central station desk of a pneumatic dispatch system comprising a plurality of transmission tubes leading from sub-stations to the central station. One of such tubes is indicated at 2, being furnished with a delivery terminal 3 normally closed by a valve 4. The tube is continued downwardly below the terminal 3 as indicated at 5 and is furnished with a portion 6 which forms a continuation of the inlet chamber of the control apparatus hereinafter more fully described.

The usual low pressure drum of such a system is indicated at 7. This drum communicates by means of a pipe 8 with the power control apparatus, terminating in a portion 9 which forms a continuation of the outlet chamber of such apparatus.

The power control apparatus forming the immediate subject matter of the present invention is indicated generally at 10 and comprises a housing having the lower part 11 which provides the outlet chamber 12. A casing 13 projects laterally into the outlet chamber 12, preferably being integral with the walls of the housing, and providing the inlet chamber 14. Preferably the inlet and outlet chambers are connected by means of a small pipe or tube 15, although if desired other means of communication may be provided.

The upper and lower walls 16 and 17 respectively, of the casing 13 are provided with aligned openings for the reception of the heads 18, 19 respectively of a balanced main valve 20. Preferably the lower head 19 of this valve is furnished with guiding fins 21 while the upper head is furnished with an axial stem 22 which slides in an opening in a boss 23 carried by the upper wall 24 of the housing 11.

A flange 25 projects substantially radially from the upper part of the housing 11 and is furnished with a circumferential seat 26. A flexible diaphragm 27 is arranged with its edges resting upon the seat 26 and is clamped in this position by a flange member 29 forming a part of the removable upper member or cover 30 of the housing. The diaphragm as thus arranged divides the upper part of the housing into chambers 31, 32 respectively. Chamber 31 communicates with the atmosphere by means of an open port 33. The central portion of the diaphragm is clamped between the two plates 34, 34ª which are secured to the upper end of the stem 22 by means of a nut 35.

A passage 36, formed in bosses 36ª, 36ᵇ constituting portions of the lower and upper parts of the housing respectively, connects the inlet cavity 14 with the upper chamber 32. Where the diaphragm 27 crosses the passage 36 it is provided with an opening 37. The passage 36 opens into the chamber 32 through a port 38 surrounded by a valve seat 39. This port is normally open but may be closed by a valve 40 provided with a stem 41 which is suitably guided to slide in an opening formed in a portion of the cover member 30.

The passage 36 also communicates with the chamber 32 by means of a port 42 which is controlled by an adjustable needle valve 43. The chamber 32 communicates with the outside atmosphere by means of a port 44 controlled by an adjustable needle valve 45.

The cover member 30 is furnished with a screw threaded opening for the reception of a bushing 46 having a guide passage for a slidable stem or post 47. A spring 48 surrounds the post 47 bearing at its upper end against the inner surface of the bushing 46 and at its lower end against a nut 49 carried by the post. The lower end 50 of the post is of spherical curvature and bears against the upper end of the stem 22. The spring 48 is normally under tension and tends to press the diaphragm downwardly and to hold it, together with the valve 20, in the position shown in Fig. 2.

The cover member 30 is provided with a depression or cavity surrounded by a wall 51 furnishing a seat 52 for the outer edge of the diaphragm 53 of an auxiliary pneumatic motor. This diaphragm is clamped in position by means of a removable cover member 54 and defines the lower and upper chambers 55, 56 respectively. The stem 41 of the controlling valve 40 projects upwardly through the bottom of the chamber 55 and is secured to the diaphragm 53 by means of a nut 57 so that any movement of the diaphragm is communicated to the valve.

A bore 58 (Fig. 4) in the cover members 54, 30, communicates by means of passages 59, 60 with the chambers 56, 55 respectively of the auxiliary motor. The lower end of the bore 58 communicates with the outer atmosphere through the port or passage 61.

A slidable, balanced piston valve 62 is arranged within the bore 58. This valve comprises the spaced heads 63, 64 and the central chamber 65. The latter chamber is always in communication with the outlet cavity 12 of the housing 11 by means of a passage 66.

The piston valve 62 is furnished with a stem 67 having a head 68 with which a spring 69 frictionally engages. This spring is carried by the cover member 54 and bears against the head 68 with sufficient pressure to retain the latter in any position in which it may be placed. The head 68 is furnished with an elongate recess 70 in one side, and a lug or finger 71 which projects laterally from the upper end of the post 47 lies within this recess. The lug or finger 71 is relatively thin vertically, as compared with the length of the recess, so that a considerable degree of movement of the post is permitted before the finger comes into operative contact with the opposite ends of the recess.

The operation of the apparatus is substantially as follows, the parts normally occupying the positions shown in Fig. 2 when there is no carrier in the transmission line. In this position of the parts, a slight current of air is moving through the transmission line, being drawn through the passage 15 and to a certain extent leaking past the heads 18, 19 of the main valve. At this time, however, the pressure in the transmission tube and in the inlet cavity 14 of the power control apparatus is negative, or slightly less than that of the atmosphere. As the cavity 14 communicates freely with the chamber 32, the latter is also under reduced pressure so that the diaphragm would tend to rise except for the action of the spring 48.

When a carrier is introduced into the transmission line, it immediately causes a lowering of the pressure in that part of the transmission line between the carrier and the control apparatus, and this decrease in pressure is sufficient to lift the diaphragm 27 against the action of spring 48, thereby opening the main valve. This permits a large volume of air to be drawn through the transmission line, rapidly moving the carrier toward its destination.

As the diaphragm 27 with the main valve rises and approaches the upper limit of its movement, the finger 71 engages the upper end of the recess 70 and moves the piston valve 62 upwardly, thereby opening communication between the lower chamber 55 of the auxiliary motor and the atmosphere through the passage 60 and port 61 and at the same time putting the upper chamber 56 of the auxiliary motor in communication with the low pressure space 12 by means of the passage 59, the central chamber 65 of the piston valve, and the passage 66. The diaphragm 53 immediately rises, closing the valve 40. As described in my co-pending application Serial No. 598,977 the needle valves 43 and 45 are so adjusted that so long as a carrier remains in the tube the flow of air through the port 42 is at least equal to the flow of air through the port 44 so that the diaphragm 27 remains in elevated position. Immediately upon discharge of the carrier from the tube the pressure in the tube rises very slightly but this slight increase is sufficient to unbalance the flow of air entering through the port 44 and discharging through port 42 so as gradually to build up the pressure in the chamber 32 until the spring 48 is enabled to depress the diaphragm thus closing the valve 20. By reason of the lost motion provided by the elongate slot or recess 70, the piston valve 57 is not disturbed during the gradual descent of the diaphragm 27 until the latter reaches substantially its lower limit of movement, whereupon the finger 71 contacts with the lower end of the recess 70 and restores the piston valve to normal position. When thus positioned, the lower chamber 55 of the auxiliary motor is in communication with the low pressure space 12 so that the diaphragm 53 is drawn downwardly, thus opening the valve 40 and restoring the parts to original position.

The arrangement above described relieves the main diaphragm of the duty of opening and closing the controlling valve 40 so that the main diaphragm may be made somewhat more sensitive to fluctuations in pressure in the transmission line. At the same time the employment of the auxiliary motor insures a positive opening and closing of the controlling valve, while the connections between the auxiliary motor and the main diaphragm are such as to allow any desired period of time to elapse between the shutting of the controlling valve and its reopening.

I claim:

1. A power controlling apparatus comprising a main valve, a motor for actuating it, a normally open controlling valve, a motor for operating the controlling valve, and means operable upon movement of the main valve for initiating operation of the controlling valve motor.

2. A power controlling apparatus comprising in combination with a pneumatic dispatch transmission tube, a main valve, a pneumatic motor comprising a movable element connected to the main valve, said element being normally exposed to the pressure conditions existing in the transmission tube for actuating the main valve, a valve for controlling pressure conditions in the motor, independent motor means for actuating the controlling valve, and means operable upon movement of the main valve for initiating operation of said independent motor means.

3. A power controlling apparatus comprising a housing having a chamber therein, a diaphragm constituting one wall of the chamber, a port opening into the chamber, a normally open valve cooperating with the port, said valve having a stem, an auxiliary motor having a movable diaphragm connected to said valve stem, a balanced valve controlling admission of fluid to said auxiliary motor, and a member moving with the first named diaphragm for positioning said balanced valve.

4. A power controlling apparatus comprising a pneumatic motor having a normally open controlling valve provided with a stem, an auxiliary motor having a diaphragm connected to said valve stem, a piston valve for admitting fluid to said auxiliary motor, and lost motion connections between said piston valve and a part actuated by the first named motor.

5. A power controlling apparatus comprising a tube and a main valve normally obstructing the full flow of air through the tube, a minimum flow through the tube being permitted normally, a pneumatically actuated motor comprising a movable element normally exposed to and directly responsive to decrease in the normal minimum flow of air in the tube to open the main valve wide, and an auxiliary pneumatically actuated control valve responsive to pressure conditions resulting from wide opening of the main valve for initiating closure of the main valve.

6. A power controlling apparatus comprising a housing having a chamber therein, a diaphragm forming one wall of the chamber, a normally open valve controlling the pressure conditions in said chamber, said valve having a stem, an auxiliary motor having a moving element connected to the stem, a fluid admission valve for the auxiliary motor, a slidable member actuable by the diaphragm, and lost motion connections between said member and the admission valve of the auxiliary motor.

7. A power controlling apparatus comprising a main valve operating motor having a slide member, an auxiliary valve, an operating motor for the latter valve, a fluid admission valve for the latter motor, provided with a stem moving in a path substantially parallel with that of the slide member, said stem having an elongate recess in its side, and a projection carried by the slide member and loosely engaging said recess.

8. A power controlling apparatus comprising a main valve operating motor of pneumatic type having a movable diaphragm and a slide member actuated thereby, an auxiliary motor for controlling the main motor, means for initiating operation of the auxiliary motor including a part movable in a path substantially parallel to that of the slide member, said part having an elongate recess, and a lug, projecting laterally from the slide member into said recess.

9. A power controlling apparatus for pneumatic transmission lines comprising a main valve, a pneumatic motor for actuating it, said motor having a diaphragm normally exposed on one side to pressure fluctuations in the transmission line, a valve operable to close communication between the pneumatic motor and the transmission line, a motor for operating the controlling valve, and means under control of said pneumatic motor for determining initiation of the operation of the controlling valve motor.

10. A power controlling apparatus for pneumatic dispatch systems comprising a housing provided with a chamber closed at one side by a diaphragm, means comprising a normally open port connecting said chamber with a low pressure space, a valve for closing the port, a motor for closing the valve, and means permitting air to bleed slowly into said chamber.

11. A power control apparatus comprising a main valve, a pneumatic motor for operating said valve having a chamber provided with a movable wall, a normally open port opening into the chamber, a movable valve cooperating with the port, an auxiliary pneumatic motor for actuating the valve, and means operable by the main valve motor for initiating operation of the auxiliary motor to close the valve controlled by the latter.

12. A power control apparatus comprising a pneumatic motor having a chamber, a diaphragm forming one wall of the chamber, a normally open port opening into the chamber, a movable valve cooperable with the port, an auxiliary pneumatic motor for actuating said valve, a controlling element for determining operation of the auxiliary motor, and means actuated by the diaphragm for positioning said controlling element to cause the port to be closed.

13. A power controlling apparatus for pneumatic dispatch systems comprising a housing having a chamber closed at one side by a movable wall, a valve controlled port normally connecting said chamber with a low pressure space, a controlling valve for closing said port, a motor for moving said controlling valve to closed position, and a port provided with an adjustable needle valve for permitting a regulable amount of air to bleed into said chamber.

14. Power controlling apparatus for pneumatic dispatch systems comprising a housing having an inlet cavity, an outlet cavity, a main valve normally closing a port between said cavities, a main valve actuating motor having a chamber closed at one side by a diaphragm, a normally open passage connecting said chamber with the inlet passage, a controlling valve for closing said passage, an auxiliary motor comprising a chamber closed at one side by a diaphragm, means connecting said latter diaphragm with the controlling valve, a piston valve having a central chamber, a passage connecting said central chamber of the piston valve with the outlet cavity of the housing, and means for moving the piston valve to put its central chamber in communication with the chamber of the auxiliary motor.

15. A power controlling apparatus comprising a housing having a chamber, a diaphragm forming one side wall of the chamber, a slide member actuated by the diaphragm, a valve controlling a port leading into the chamber, an auxiliary housing provided with a pressure controlled diaphragm connected to said valve, a fluid admission valve for controlling admission of fluid to the auxiliary housing, said admission valve having a stem provided with an axially elongate recess, and a lug projecting from the slide member into said recess, said lug being of less thickness than the length of the recess.

16. A power controlling apparatus comprising a housing provided with a chamber, a diaphragm constituting one wall of the chamber, a slidable post normally bearing upon the diaphragm and tending to move it outwardly from the chamber, a port connecting the chamber with a low pressure space, a normally open valve for controlling said port, a pneumatic motor for closing said valve, and a controller for said motor comprising a sliding member having lost motion connections with the aforesaid slidable post.

17. A power controlling apparatus comprising a housing provided with a chamber, a diaphragm constituting one wall of the chamber, a spring pressed slidable post bearing against the central part of the diaphragm, a port in the wall of the chamber, a normally open valve for controlling the port, a pneumatic motor for closing the valve, means for initiating operation of the motor comprising a sliding element, means tending to hold said element in any position in which it may be placed, and a finger projecting from the aforesaid post and engageable with said element for displacing the latter.

18. A power controlling apparatus comprising a main valve and a motor for actuating it, said motor having a controlling valve, an auxiliary motor for moving said valve, a piston valve for determining actuation of the motor, resilient means normally holding said piston valve in any position in which it may be placed, and lost motion connections between the piston valve and a moving element of the main valve actuating motor.

19. A power controlling apparatus comprising a main valve and a motor for actuating it, a controlling element for said motor, an auxiliary fluid motor for moving said element, a slidable valve member for determining operation of the auxiliary motor, said valve member having a stem, a spring having frictional engagement with the stem to retain it in adjusted position, and a lug carried by a moving port of the main valve actuating motor and engaging an axially elongate recess in the stem of the slide valve.

20. A power controlling apparatus comprising a main valve, a main pneumatic motor for actuating the main valve having a chamber normally communicating with a low pressure space, a valve shutting off such communication, an auxiliary pneumatic motor for moving said valve, said pneumatic motor having a chamber normally communicating with the atmosphere, and means operated by the main motor for placing said chamber in communication with a low pressure space.

21. A power controlling apparatus for carrier dispatch systems comprising a tube and a main valve normally obstructing the full flow of air through the tube, means permitting a normal minimum flow of air through the tube, a pneumatically actuated motor comprising a moving part exposed to and directly responsive to decrease in the minimum flow of air in the tube to open wide the main valve, a control valve for initiating closure of the main valve, and an auxiliary motor responsive to pressure conditions resulting from wide opening of the main valve to actuate the control valve, the closure of the main valve being determined by the delivery of a carrier from the tube.

22. A power controlling apparatus for pneumatic dispatch systems comprising a tube, a main valve normally preventing a maximum flow of air through the tube, a normal minimum flow of air through the tube being permitted, a pneumatic motor for operating the valve, said motor having a pressure actuated element freely exposed upon one side to atmospheric pressure and subject at its other side to the pressure in the tube acting through a normally open passage, and means operative as the main valve approaches its open position for restricting said passage.

23. A power controlling apparatus comprising a main pneumatic motor having a moving part freely open at one side to atmospheric pressure, an auxiliary pneumatic motor for limiting the period of operative movement of said motor, a valve for admitting pressure fluid to the auxiliary motor, and connections operable as the aforesaid moving part approaches either limit of its path of movement for shifting said valve.

24. Power controlling apparatus for a pneumatic dispatch system comprising a housing having a plurality of cavities therein; one of said cavities communicating with a carrier receiving tube and another with a low pressure space, a main valve normally closing a port between said cavities, a chamber normally communicating with the first of said cavities, a diaphragm constituting a wall of said chamber, a valve for cutting off communication between said chamber and the first of said cavities, an auxiliary pneumatic motor for closing said valve, valve mechanism for said auxiliary pneumatic motor comprising a distributing chamber normally communicating with the second of said cavities, and an element movable by the diaphragm for opening communication between the distributing chamber and the power chamber of the auxiliary pneumatic motor.

25. Power controlling apparatus for pneumatic dispatch systems comprising a housing having an inlet cavity, an outlet cavity, a main valve normally closing a port between said cavities, a motor for actuating said valve, a normally open controlling valve for the motor, an auxiliary pneumatic motor having a chamber closed at one side by a diaphragm, connections between said diaphragm and the motor controlling valve for closing the latter, a valve casing, a valve sliding in a bore in the casing, a passage connecting said bore with the chamber of the auxiliary motor, a passage connecting the bore with the outlet cavity of the housing, said sliding valve normally cutting off communication between said passages, and means operative by the main valve actuating motor for shifting said sliding valve to open communication between said passages.

26. Power controlling apparatus for pneumatic dispatch systems, comprising a main valve, a motor for actuating it, an auxiliary motor comprising a chamber provided at one side with a diaphragm, a valve casing having a bore communicating with said chamber, a piston valve sliding in said bore, said valve having a central chamber, a passage connecting said central chamber with a low pressure space, and means operated by the main valve actuating motor for shifting said valve whereby to put the low pressure space into communication with the chamber of the auxiliary motor.

27. Power controlling apparatus comprising a housing having a chamber therein and a diaphragm forming one wall of said chamber, means connecting said chamber with a space in which a predetermined air pressure is normally maintained, means operable upon movement of the diaphragm under slight decrease in pressure below the normal pressure in said space for producing a relatively great decrease in pressure in said space, and means operable upon subsequent increase in the pressure in said space to a point below the normal pressure to cause return of the diaphragm to its initial position.

28. Power controlling apparatus comprising a housing having a chamber communicating with a space in which air pressure fluctuates, means operable upon a slight decrease in air pressure in said space to reduce the pressure in said space to a minimum, means concomitantly operative to prevent decrease in pressure in said chamber below a predetermined point substantially above said minimum, and means operative upon slight increase in pressure in said chamber above said predetermined point to restore pressure conditions in said space to normal.

29. Power controlling apparatus for use in a pneumatic system having a transmission tube and a suction tube comprising a motor having a chamber communicating with the transmission tube, a diaphragm forming a wall of the chamber and movable inwardly of the chamber upon slight decrease in pressure in the transmission tube, a valve operable upon such movement of the diaphragm to open communication between the transmission and suction tubes thereby greatly decreasing the pressure in the transmission tube, means preventing communication of such great decrease in pressure to the chamber, and means operable upon subsequent slight increase in pressure in said chamber for moving the diaphragm and valve to initial position.

30. Power control apparatus for use in a pneumatic dispatch system having a transmission tube, a low pressure chamber and a valve for controlling communication between the chamber and tube, comprising a motor provided with a pressure operated member for actuating said valve, means normally maintaining the pressure at one side of said pressure operated member substantially equal to that in the tube whereby upon slight decrease in pressure in the tube said member is moved thereby opening the valve and putting the tube into free communication with the low pressure chamber, and means operative upon opening of the valve for preventing reduction in pressure at the aforesaid side of said pressure operated member to the same extent as that which takes place in the tube when the valve is opened.

31. A power control apparatus comprising in combination with a transmission tube, a suction tube, and a valve for controlling communication therebetween, a motor for actuating the valve having a chamber provided with a movable wall, means connecting said wall to the valve, a normally open port connecting the chamber with the transmission tube, a second port of relatively small capacity also connecting the transmission tube with said chamber, and means operable upon movement of said movable wall to close the first named port.

32. Power control apparatus for pneumatic systems comprising a pneumatic motor having a chamber and a diaphragm forming a wall thereof, a restricted port connecting the chamber with the outer air, a pair of ports connecting the chamber with a space in which the air pressure varies from time to time, one of said latter ports being restricted and the other relatively large, a valve for closing the larger port, and connections between the diaphragm and last named valve for moving the latter to closed position upon movement of the diaphragm in one direction.

33. A power control apparatus for use in pneumatic dispatch systems comprising a motor having a chamber provided with a movable wall, a pair of passages of relatively large and small capacity, respectively, connecting said chamber with a space in which the air pressure fluctuates, and means operative to close the larger of said passages upon movement of said movable wall responsive to decrease in pressure in said space.

34. A power control apparatus for use in pneumatic dispatch systems comprising a motor having a chamber closed at one side by a diaphragm, means whereby the chamber may be evacuated at a rapid rate to produce inward movement of the diaphragm, means permitting evacuation of the chamber at a relatively slower rate, means for permitting entrance of air into the chamber at a rate approximately the rate of evacuation of the chamber by the last named means, and means actuable upon inward movement of the diaphragm to render said first named evacuation means inoperative.

35. A pneumatic motor for use in pneumatic dispatch systems comprising a housing having a chamber closed at one side by a diaphragm, a passage leading to said chamber and communicating therewith by means of two ports, one of said ports being provided with a needle valve and the other being normally unobstructed, a valve for completely closing said latter port, and means actuable by the diaphragm for closing said latter valve.

36. A pneumatic motor for pneumatic dispatch systems comprising a housing provided with a chamber closed at one side by a diaphragm, means comprising a normally open port connecting said chamber with a low pressure space, valve means actuable by the diaphragm for closing said port, and regulable means permitting air to bleed from said chamber into said low pressure space and also from the outer atmosphere into said chamber.

37. A pneumatic motor for pneumatic dispatch systems comprising a housing having a chamber closed at one side by a movable wall, a valve controlled port normally connecting said chamber with a low pressure space, a second port connecting said chamber and space, said second port having an adjustable needle valve whereby the passage through the port may be regulated, and a port connecting said chamber with the outer atmosphere.

38. A power control apparatus for pneumatic systems comprising a housing having a chamber closed at one side by a diaphragm, a port controlled by an adjustable needle valve for permitting a regulable amount of atmospheric air to bleed into said chamber, a port controlled by a needle valve for permitting a regulable quantity of air to bleed from said chamber into a low pressure space, and a relatively large, normally open valve-controlled port also connecting the chamber with such low pressure space.

39. A power control apparatus for pneumatic dispatch systems comprising a housing having a chamber provided with a movable wall, a relatively large passage normally connecting said chamber with a space in which a negative pressure is maintained whereby upon slight variation in pressure in such space the movable wall is caused to move, means operable upon movement of said wall to cause a relatively great variation in pressure in said space and for concomitantly closing said passage, and regulable means permitting relatively small amounts of air to bleed from said chamber into said space and from the outer atmosphere into said chamber whereby to maintain in said chamber a pressure substantially different from that in said space after the aforesaid movement of said movable wall.

40. Power control apparatus for a pneumatic dispatch transmission line in which a minimum flow of air is normally maintained comprising a main valve, and means responsive to a predetermined pressure in the line for moving the valve whereby to establish a relatively low carrier transmission pressure in the line, said means being sensitively responsive to pressure in the line intermediate the transmission pressure and said predetermined pressure to initiate movement of the valve in the opposite direction.

41. Power control apparatus for a pneumatic transmission line in which a predetermined normal pressure is maintained comprising a normally closed main valve, and means sensitive to the slight decrease in pressure below normal in the transmission line incident to introduction of a carrier into the line to initiate opening of the valve to establish a carrier transmitting pressure in the line, said pressure being lower than that due to introduction of the carrier, said means also being sensitive to subsequent rise in pressure in the transmission line to a point above the transmission pressure but below that produced by introduction of the carrier into the line whereby to initiate closing of the main valve.

42. Power control apparatus for a pneumatic transmission line in which a predetermined air pressure is normally maintained comprising a main valve, and means operative upon the slight change from normal pressure in the transmission line incident to introduction of a carrier therein to initiate opening of the main valve and thereby establish carrier transmitting pressure in the transmission line, said means holding the main valve open so long as transmission pressure remains in the transmission line, said means being actuable by pressure in said line intermediate the transmission pressure and normal pressure to initiate closing of the main valve.

43. A power control apparatus for a pneumatic transmission line comprising a main valve and a plurality of motors, one of said motors being constructed and arranged to initiate opening of the main valve upon decrease in pressure in the transmission line incident to the insertion of a carrier therein, and another of the motors initiating closing of the main valve upon the increase in pressure in the transmission line incident to discharge of a carrier therefrom.

Signed by me at Syracuse, N. Y., this 23d day of May, 1923.

JAMES T. COWLEY.